(12) United States Patent
Huang (10) Patent No.: US 11,758,316 B2
(45) Date of Patent: Sep. 12, 2023

(54) WIRELESS EARPHONE CHARGING CASE CONVENIENT FOR REPLACING OUTER SHELLS

(71) Applicant: ZhuoYe ChuangYi Co., Ltd., Shenzhen (CN)

(72) Inventor: Yong Huang, Jian'ou (CN)

(*) Notice: Subject to any disclaimer, the term of this patent is extended or adjusted under 35 U.S.C. 154(b) by 0 days.

(21) Appl. No.: 18/081,726

(22) Filed: Dec. 15, 2022

(65) Prior Publication Data

US 2023/0116219 A1    Apr. 13, 2023

(30) Foreign Application Priority Data

Sep. 20, 2022 (CN) .................. 202222491961.X (51) Int. Cl.
*H04R 1/10* (2006.01)
*H02J 7/00* (2006.01)

(52) U.S. Cl.
CPC .......... *H04R 1/1025* (2013.01); *H02J 7/0044* (2013.01); *H04R 1/1041* (2013.01)

(58) Field of Classification Search
CPC .... H04R 1/1025; H04R 1/1041; H02J 7/0044
See application file for complete search history.

(56) References Cited

U.S. PATENT DOCUMENTS

| | | | |
|---|---|---|---|
| 11,115,746 B1* | 9/2021 | Morrison | H04R 1/1025 |
| 11,172,101 B1* | 11/2021 | Boozer | H04N 23/57 |
| 2017/0094399 A1* | 3/2017 | Chandramohan | H04B 5/0037 |
| 2017/0195770 A1* | 7/2017 | Cheney | H04R 1/1016 |
| 2019/0075385 A1 | 3/2019 | Lee et al. | |
| 2020/0304899 A1* | 9/2020 | Cramer | A45C 15/00 |
| 2020/0390402 A1* | 12/2020 | Fernando | G08B 7/06 |
| 2021/0085047 A1* | 3/2021 | Wright | A45C 13/02 |
| 2021/0281942 A1 | 9/2021 | Feng et al. | |
| 2021/0345031 A1* | 11/2021 | DeMaio | H04R 1/1016 |
| 2021/0345742 A1* | 11/2021 | Wright | A45F 5/021 |
| 2022/0201113 A1* | 6/2022 | Peng | H04W 52/0251 |
| 2022/0209567 A1 | 6/2022 | Li | |
| 2022/0217463 A1* | 7/2022 | Panecki | G06F 3/167 |
| 2023/0084210 A1* | 3/2023 | Kheraj | H04R 1/1016 381/74 |

* cited by examiner

*Primary Examiner* — Simon King (57) ABSTRACT

The present invention relates to the technical field of charging wireless earphones, in particular to a wireless earphone charging case convenient for replacing outer shells. Its outer shell has an upper shell and a lower shell that are capable of being disengaged/engaged from/with each other, wherein a containing space is arranged inside the lower shell, a charging chamber is arranged within the containing space, a screw slot is arranged on bottom of the charging chamber, the bottom of the lower shell is fixed to the screw slot on the bottom of the charging chamber by means of a metal screw.

9 Claims, 10 Drawing Sheets

WIRELESS EARPHONE CHARGING CASE CONVENIENT FOR REPLACING OUTER SHELLS

FIELD OF THE INVENTION

The present invention relates to the technical field of charging wireless earphones, in particular to a wireless earphone charging case convenient for replacing outer shells.

BACKGROUND ART

The wireless earphone charging cases in the prior art have an outer shell, which is typically integrated with inner charging components, and cannot be replaced alone to make the charging case look new again at its damage or aging, instead to only enable the charging case to be replaced, so that it causes waste of resources and makes against maintenance of a charging cases with beautiful appearances.

SUMMARY OF THE INVENTION

In order to overcome the above problem, the present invention provides a wireless earphone charging case convenient for replacing outer shells, which can effectively solve the above problem.

A technical solution provided by the present invention to solve the above technical problem is a wireless earphone charging case convenient for replacing outer shells, which includes an outer shell, wherein the outer shell has an upper shell and a lower shell that are capable of being disengaged/engaged from/with each other, a containing space is arranged inside the lower shell, a charging chamber is arranged within the containing space, a screw slot is arranged on bottom of the charging chamber, the bottom of the lower shell is fixed to the screw slot on the bottom of the charging chamber by means of a metal screw, an LED strip is arranged on the side of the charging chamber, a light-guiding post is arranged on the outside of the lower shell, and the position of the light-guiding column corresponds to the position of the LED strip.

Preferably, a positioning hole is arranged at the bottom of the charging chamber and a positioning column is arranged at the bottom of the containing space to fit with the positioning hole.

Preferably, a charging circuit board is arranged inside the charging chamber, a charging pin is connected with the charging circuit hoard, two charging, slots are arranged inside the charging chamber, the charging pin is arranged at the bottom of the charging slot.

Preferably, the charging chamber has a charging protrusion that is formed in an integration on the bottom and protrudes outwards, a charging interface is arranged on the charging protrusion, the charging interface is connected to the charging circuit board, and the charging interface emerges from the bottom of the lower shell.

Preferably, an opening fitting with the charging protrusion is arranged at the bottom of the containing space, and the charging protrusion is embedded into the opening.

Preferably, the light-guiding column includes an outer light-guiding column and an inner light-guiding strip, which are formed in an integration, the outer light-guiding column is arranged outside the lower shell, and the inner light-guiding strip is fixed inside the lower shell and positioned at one side of the LED strip.

Preferably, a decorative stripe is arranged on the upper side of the charging chamber, a hollow portion is arranged on the upper side of the lower shell, and the decorative stripe emerges from the hollow section.

Preferably, the charging chamber has a first rating plate area arranged on its one side and a second rating plate area arranged on its other side.

Preferably, the light-guiding column is made from light transmitting acrylic.

Compared with the prior art, the charging chamber is arranged inside the containing space of the wireless earphone charging case convenient for replacing outer shells provided by the present invention, the bottom of the charging chamber is connected with the bottom of the lower shell by screws, enabling the charging chamber to be easily disassembled form the outer shell. Whether the outer shell damages or the charging chamber malfunctions, either of them can be replaced individually, for convenience to maintain and benefit to save resources, and replacing the outer shell individually enables its appearance to keep new and beautiful for a longtime.

DETAILED DESCRIPTION OF SOME EMBODIMENTS

In order to more clearly understand the objective, technical solution and advantages of the present invention, we shall further describe the present invention in combination with the drawings and the specific examples as follows. It is understandable that the specific examples are described herein only for explaining the present invention, not imposing any limitation on it.

It should be noted that all directional indications (such as up, down, left, right, front, back . . . ) in the examples of the present invention are limited to an indication of relative positions on the view, instead of absolute positions.

Furthermore, it is understandable that descriptions such as "first" and "second" in the present invention are only used for descriptive purposes, instead of the purposes to indicate or imply their relative importance or implicitly specify the number of the technical features indicated by them. Thus, the features defined by "first" and "second" may explicitly or implicitly include at least one of themselves. In the description of the present invention, "plurality" means at least two, for example, two, three, etc., unless otherwise expressly and specifically limited.

Figure 1:
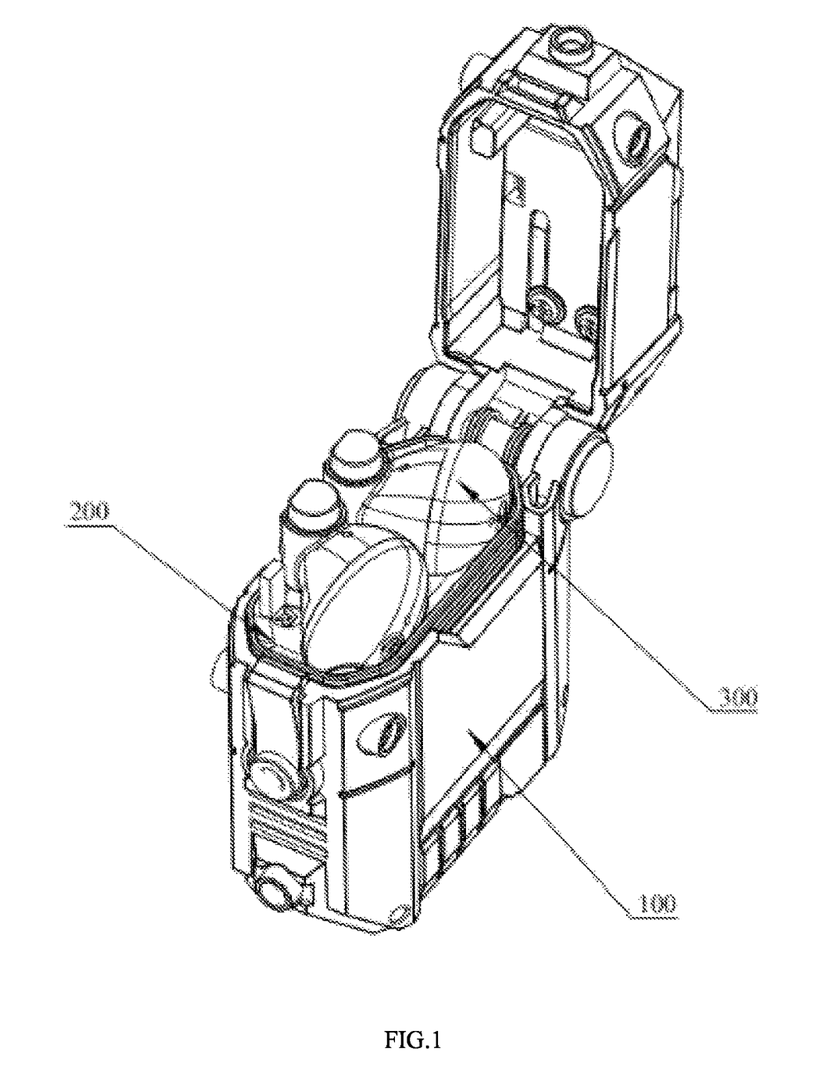
FIG. 1 shows a first 3D stereogram of the wireless earphone charging case convenient for replacing outer shells according to the present invention.
Figure 2:
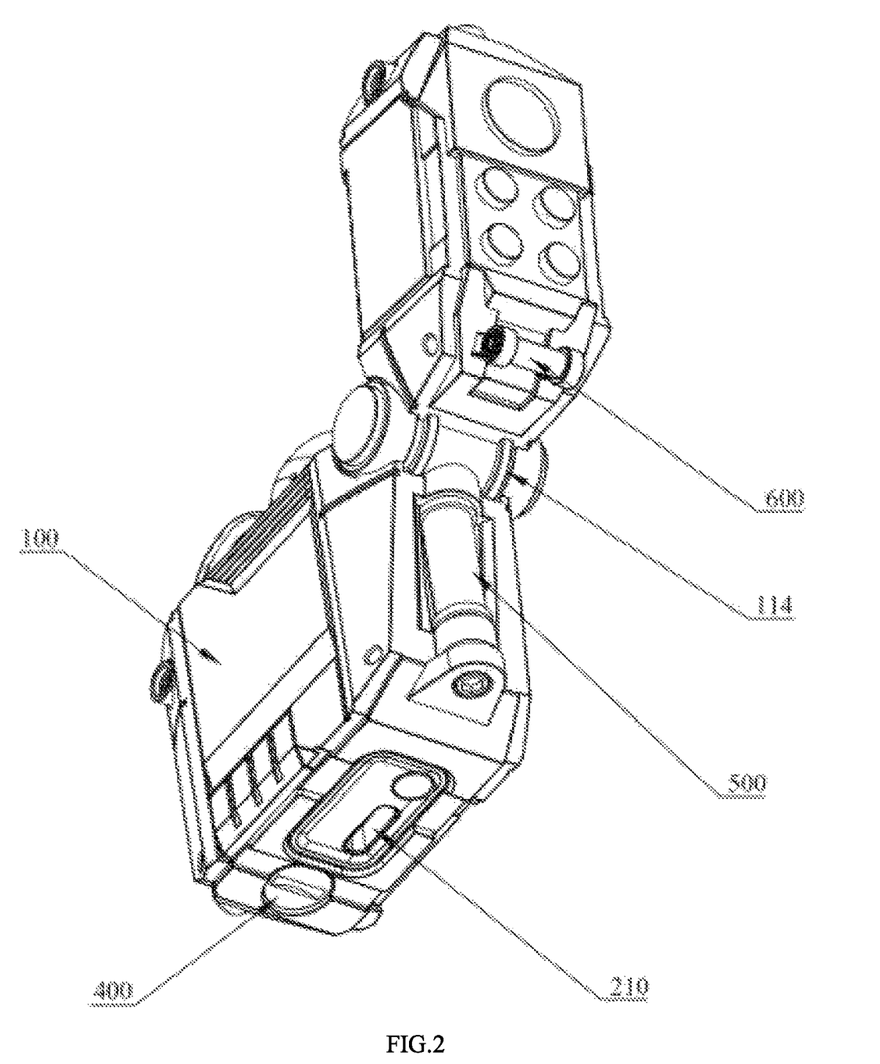
FIG. 2 shows a second 3D stereogram of the wireless earphone charging case convenient for replacing outer shells according to the present, invention.
Figure 3:
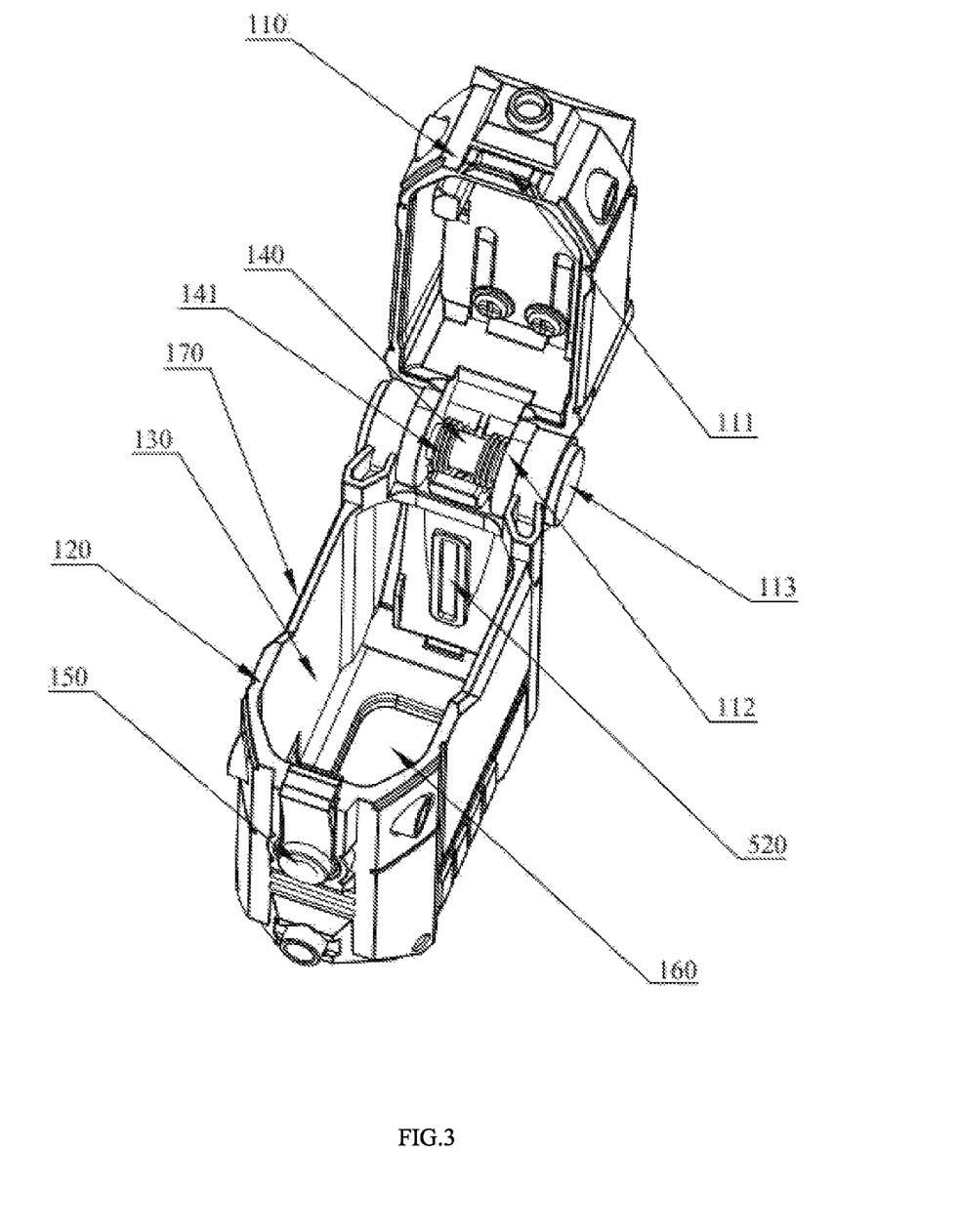
FIG. 3 shows a stereogram of the outer shell of the wireless earphone charging case convenient for replacing outer shells according to the present invention.
Figure 4:
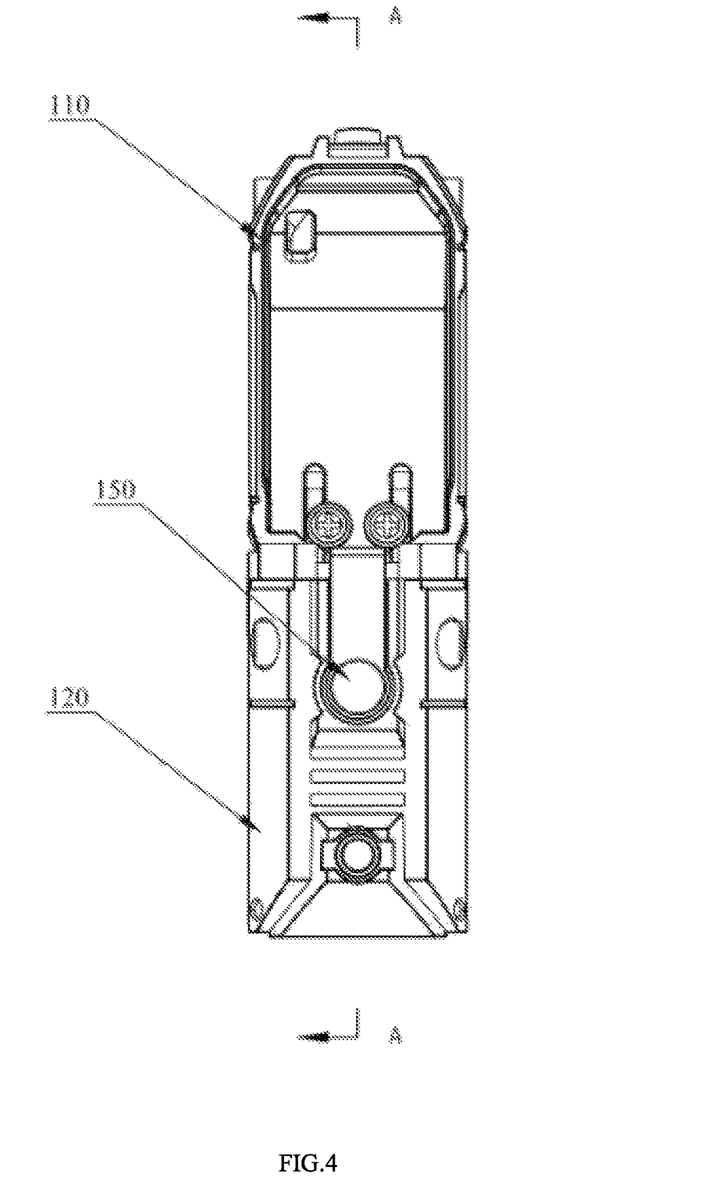
FIG. 4 shows a front view of the outer shell of the wireless earphone charging case convenient for replacing outer shells according to the present invention.
Figure 5:
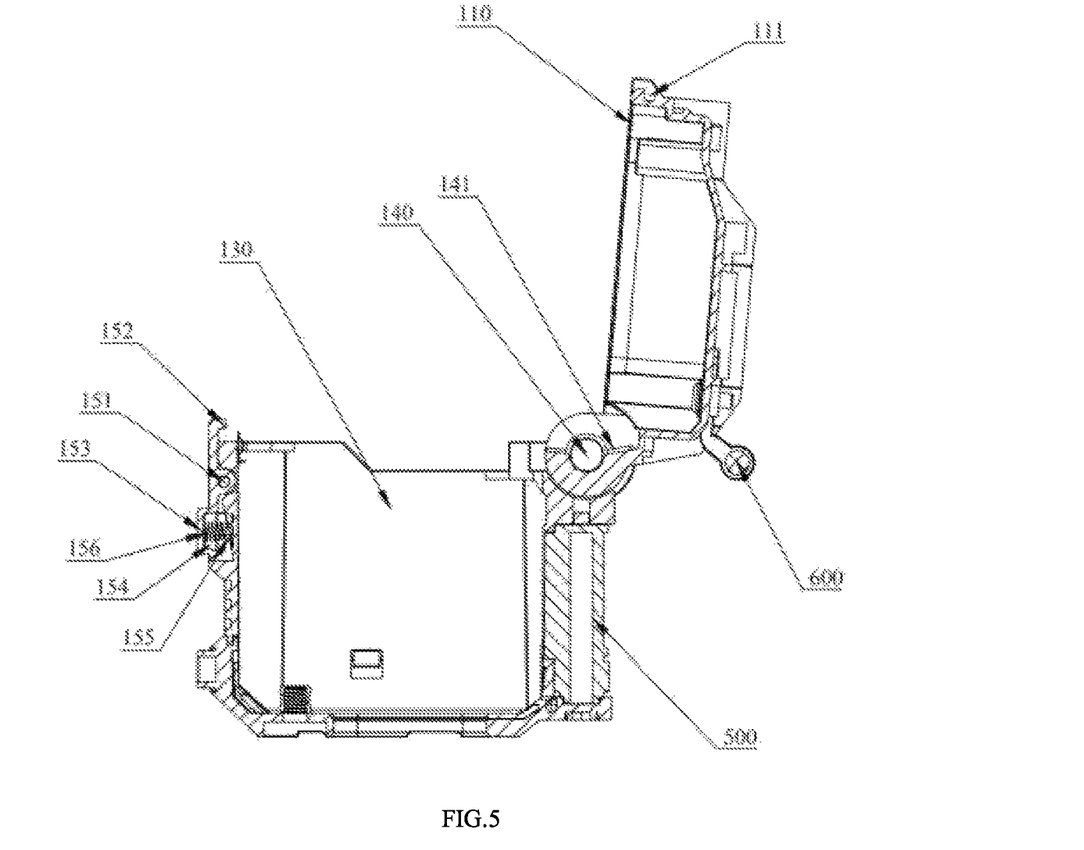
FIG. 5 shows an A-A sectional view in FIG. 4.
Figure 6:
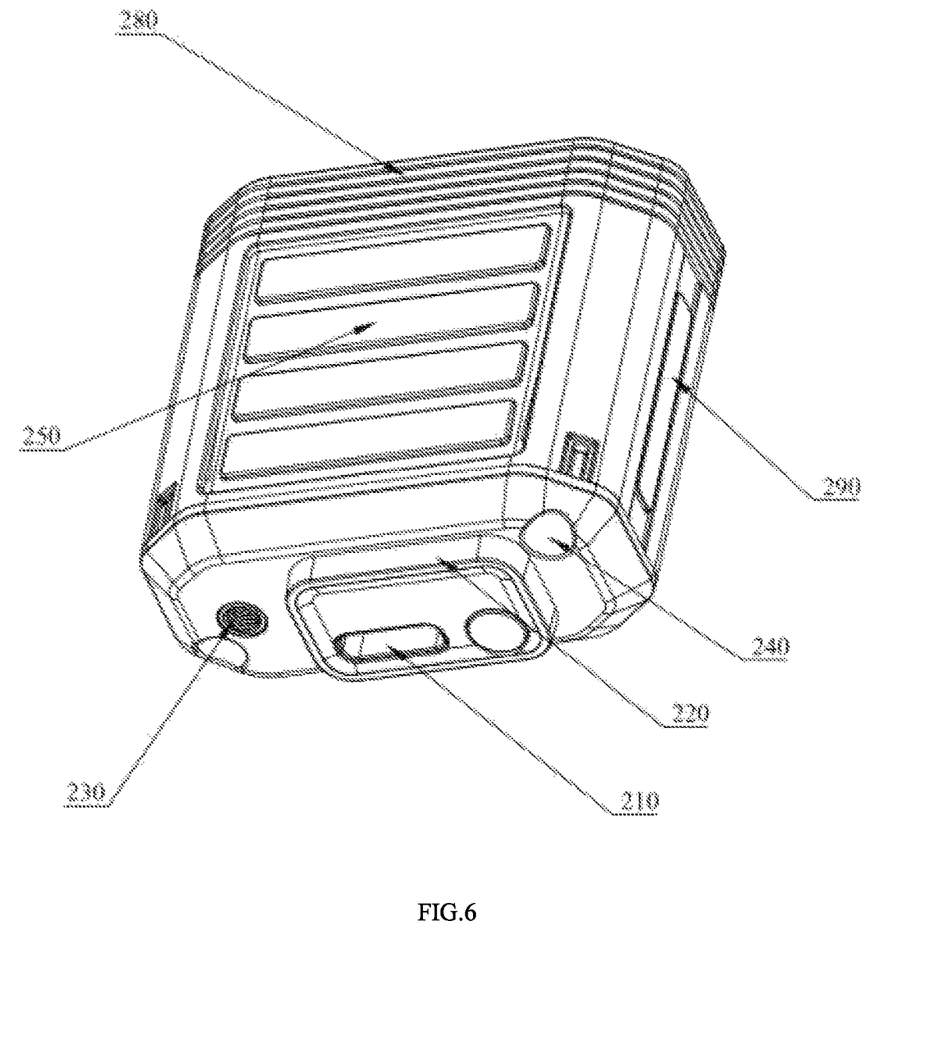
FIG. 6 shows a first 3D stereogram of the charging chamber of the wireless earphone charging case convenient for replacing outer shells according to the present invention.
Figure 7:
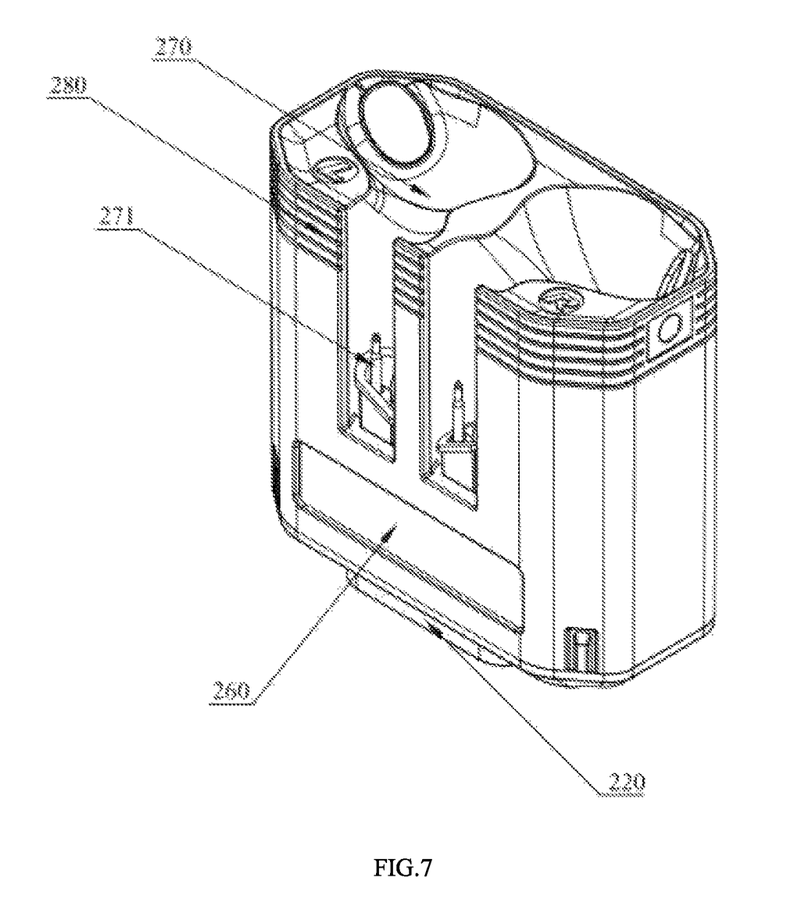
FIG. 7 shows a second 3D stereogram of the charging chamber of the wireless earphone charging case convenient for replacing outer shells according to the present invention.
Figure 8:
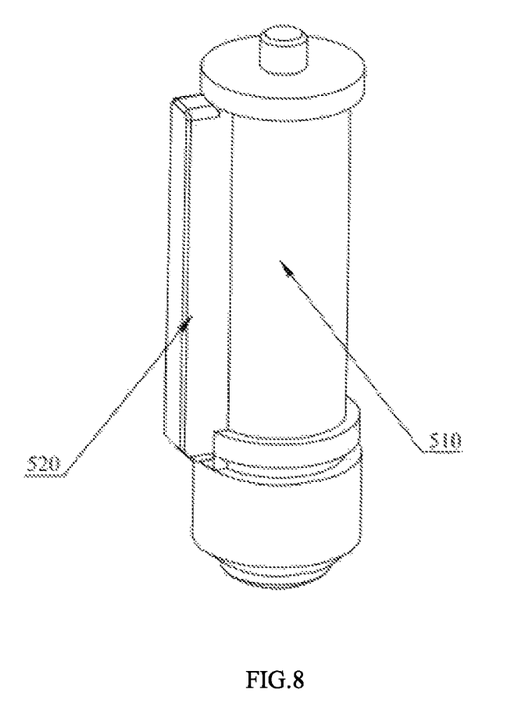
FIG. 8 shows a stereogram of the light-guiding column of the wireless earphone charging case convenient for replacing outer shells according to the present invention.
Figure 9:
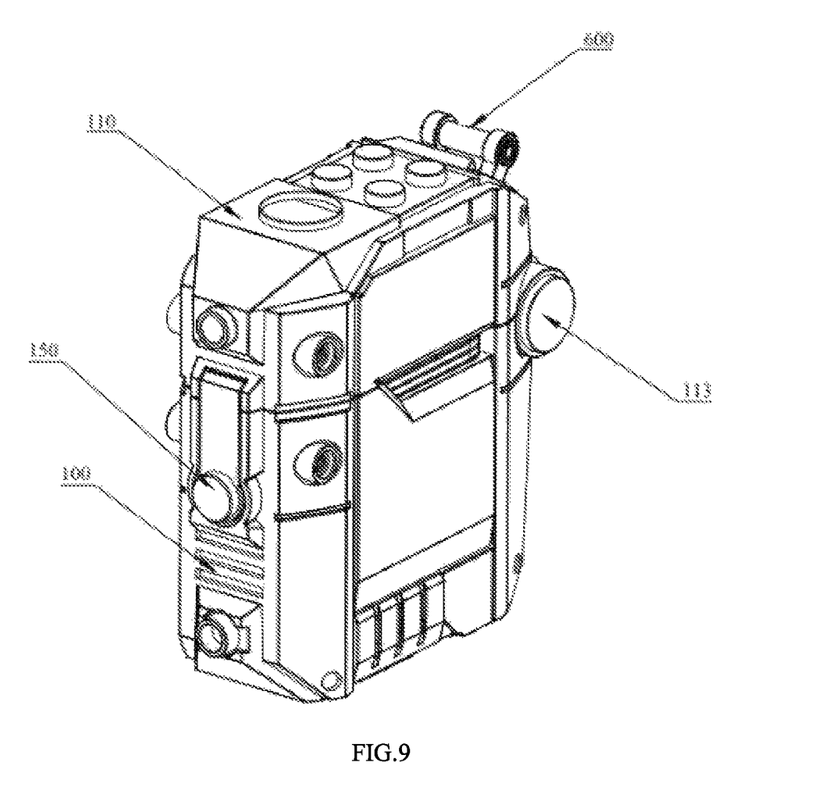
FIG. 9 shows a first schematic view of the mergence state of the wireless earphone charging case convenient for replacing outer shells according to the present invention.
Figure 10:
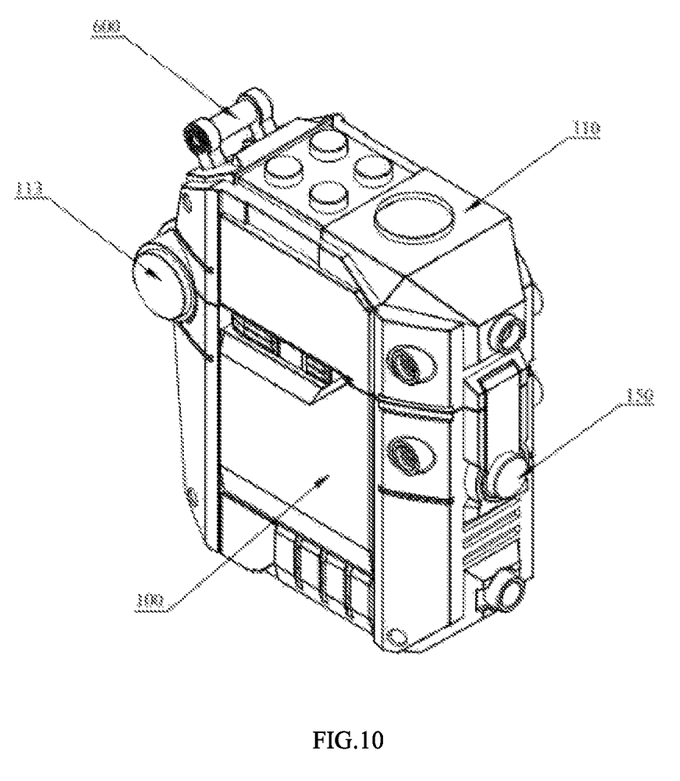
FIG. 10 shows a second schematic view of the mergence state of the wireless earphone charging case convenient for replacing outer shells according to the present invention.

As shown in FIGS. 1-10, the wireless earphone charging case convenient for replacing outer shells according to the present invention includes the outer shell 100, wherein the outer shell 100 has the upper shell 110 and the lower shell 120, the containing space 130 is arranged inside the lower shell 120, the charging chamber 200 is arranged within the containing space 130, and the bottom of the charging chamber 200 is fixed on the bottom of the lower shell 120 by means of a metal screw, enabling the charging chamber 200 to be easily disassembled form the outer shell 100. Whether the outer shell 100 damages or the charging chamber 200 malfunctions, either of them can be replaced individually, for convenience to maintain and benefit to save resources, and replacing, the outer shell 100 individually enables its appearance to keep new and beautiful for a long time.

Two charging slots 270 are arranged inside the charging chamber 200, the earphone 300 is placed inside the charging slot 270 for charging.

The screw slot 230 is arranged on bottom of the charging chamber 200, the bottom of the lower shell 120 is fixed to the screw slot 230 on the bottom of the charging chamber 200 by means of the metal screw 400.

The positioning hole 240 is arranged at the bottom of the charging chamber 200 and a positioning column is arranged at the bottom of the containing space 130 to, fit with the positioning hole 240. During assembly, the positioning column is inserted into the positioning hole 240 for preliminary positioning and then tightened by means of the metal screw 400.

A charging circuit board is arranged inside the charging chamber 200, the charging pin 271 is connected with the charging circuit board, the charging pin is arranged at the bottom of the charging slot 270, so as to touch the earphone 300 for charging. The charging circuit board pertains to the prior art, not to be further described herein.

The charging chamber 200 has the charging protrusion 220 that is formed in an integration on the bottom and protrudes outwards, the charging interface 210 is arranged on the charging protrusion 220, the charging interface 210 is connected to the charging circuit board, and the charging interface 210 emerges from the bottom of the lower shell 120, so as to connect a charger for energy storage of the charging chamber 200. The opening 160 fitting with the charging protrusion 220 is arranged at the bottom of the containing space 130, and the charging protrusion 220 is embedded into the opening 160, enabling positioning to some degree and convenience to quickly assemble.

The LED strip 290 is arranged on the side of the charging chamber 200, the LED strip 290 is connected with the charging circuit board, so as to give out light during operation. The light-guiding column 500 is arranged on the outside of the lower shell 120, and the position of the light-guiding column 500 corresponds to the position of the LED strip 290, so as to conduct the light emitted by the LED strip 290 out from the outer shell 100 for aesthetic purposes. The light-guiding column 500 is made from light transmitting acrylic, including the outer light-guiding column 510 and the inner light-guiding strip 520 both formed in an integration, the outer light-guiding column 510 is arranged outside the lower shell 120, and the inner light-guiding strip 520 is fixed inside the lower shell 120 and positioned on one side of the LED strip 290. The present invention being designed with the light-guiding column 500 for lumination also more conduces to a novel shape and beautiful appearance.

The decorative stripe 280 is arranged on the upper side of the charging chamber 200 and the hollow portion 170 is arranged on the upper side of the lower shell 120, and the decorative stripe 280 emerges from the hollow section 170, conducing to beautification of appearance.

The charging chamber 200 has the first rating plate area 250 arranged on its one side and the second rating plate 260 area arranged on its other side, both used to mark product-related information and tips.

The upper shaft joint 112 is arranged on, one end of the upper shell 110, the lower shaft joint 113 is arranged on one end of the lower shell 120, and the upper shaft joint 112 and the lower shaft joint 113 are axially connected with each other by means of the first rotary shaft 140, so as to disengage/engage the upper shell 110 from/with the lower shell 120.

The clipping slot 111 is arranged on the other end of the upper shell 110, the clipping catch 150 is arranged on the other end of the lower shell 120, and the clipping catch 150 is clipped within the clipping slot 111, and makes a fixation after mergence of the upper shell 110 and the lower shell 120.

The torsion spring 141 is arranged outside the first rotary shaft 140, when the clipping catch 150 is pressed, it can disengage from the inside of the clipping slot 111, and the upper shell 110 springs upwards to open around the first rotary shaft 140 under the function of the torsion spring 141, so that it does not need to be turned up manually for more convenience to use and brings users with a better experience.

The clipping hook 152 is arranged on the upper end of the clipping catch 150, the pressing portion 153 is arranged on the lower end of the clipping catch 150, the central part of the clipping catch 150 is axially connected to one side of the lower shell 120 by means of the rotary shaft 151. The spring groove 154 is arranged inside the pressing portion 153, the compression spring 156 is arranged inside the spring groove 154, and the clipping hook 152 is clipped inside the clipping slot 111 under the function of the compression spring 156. When the pressing portion 153 is pressed, the clipping hook 152 rotates outwards around the second rotary shaft 151, and it disengages from the clipping slot 111, thereby releasing the upper shell 110 to open. The clipping catch 150 is made from zinc alloy for a more textured appearance. The spring positioning column 155 is arranged inside the spring groove 154, and the compression spring 156 sleeves the spring positioning column 155 for positioning.

The arc-shaped block 114 is arranged outside the upper shaft joint 112, when the upper shell 110 springs up and turns 95° under the function of the torsion spring, the arc-shaped block 114 withstands the lower shell 120 to form a stop to prevent over opening.

The lanyard piece 600 is fixed to the outside of the upper shell 110 for connecting a lanyard for easy carrying.

Compared with the prior art, the charging chamber 200 is arranged inside the containing space 130 of the wireless earphone charging case convenient for replacing outer shells provided by the present invention, the bottom of the charging chamber 200 is connected with the bottom of the lower shell 120 by screws, enabling the charging chamber 200 to be easily disassembled form the outer shell 100. Whether the outer shell 100 damages or the charging chamber 200 malfunctions, either of them can be replaced individually, for convenience to maintain and benefit to save resources, and replacing the outer shell 100 individually enables its appearance to keep new and beautiful for a long time.

The examples described above is only a preferred embodiment of the present invention, but no limitation therefrom is imposed on the patent scope of the invention. Any modification, equivalent substitution or improvement within the concept of the invention shall fall within the patent protection scope of the present invention.

What is claimed is:

1. A wireless earphone charging case convenient for replacing outer shells, comprising: an outer shell, and said outer shell having an upper shell and a lower shell that are capable of being disengaged/engaged from/with each other, wherein a containing space is arranged inside said lower shell, a charging chamber is arranged within the containing space, a screw slot is arranged on bottom of the charging chamber, the bottom of said lower shell is fixed to the screw slot on the bottom of the charging chamber by means of a metal screw;

an LED strip is arranged on the side of the charging chamber, a light-guiding post is arranged on the outside of said lower shell, and the position of the light-guiding column corresponds to the position of the LED strip.

2. The wireless earphone charging case convenient for replacing outer shells according to claim 1, wherein a positioning hole is arranged at the bottom of the charging chamber and a positioning column is arranged at the bottom of the containing space to fit with the positioning hole.

3. The wireless earphone charging case convenient for replacing outer shells according to claim 1, wherein a charging circuit board is arranged inside the charging chamber, a charging pin is connected with the charging circuit board, two charging slots are arranged inside the charging chamber, the charging pin is arranged at the bottom of the charging slot.

4. The wireless earphone charging case convenient for replacing outer shells according to claim 3, wherein the charging chamber has a charging protrusion that is formed in an integration on the bottom and protrudes outwards, a charging interface is arranged on the charging protrusion, the charging interface is connected to the charging circuit board, and the charging interface emerges from the bottom of said lower shell.

5. The wireless earphone charging case convenient for replacing outer shells according to claim 4, wherein an opening fitting with the charging protrusion is arranged at the bottom of the containing space, and the charging protrusion is embedded into the opening.

6. The wireless earphone charging case convenient for replacing outer shells according to claim 1, wherein the light-guiding column includes an outer light-guiding column and an inner light-guiding strip, which are formed in an integration, the outer light-guiding column is arranged outside said lower shell, and the inner light-guiding strip is fixed inside said lower shell and positioned at one side of the LED strip.

7. The wireless earphone charging case convenient for replacing outer shells according to claim 1, wherein a decorative stripe is arranged on the upper side of the charging chamber, a hollow portion is arranged on the upper side of said lower shell, and the decorative stripe emerges from the hollow section.

8. The wireless earphone charging case convenient for replacing outer shells according to claim 1, wherein the charging chamber has a first rating plate area arranged on its one side and a second rating plate area arranged on its other side.

9. The wireless earphone charging case convenient for replacing outer shells according to claim 1, wherein the light-guiding column is made from light transmitting acrylic.

\* \* \* \* \*